US007756878B2

(12) United States Patent
Findley et al.

(10) Patent No.: US 7,756,878 B2
(45) Date of Patent: Jul. 13, 2010

(54) E-MAIL RESPONSE SYSTEM

(75) Inventors: David Norman Findley, St. Louis, MO (US); Karthik Kannan, Maryville, IL (US); Srinivas Cherukuri, St. Louis, MO (US); Robert Meyer, Ballwin, MO (US); Amy Hicks, Belleville, IL (US); Benjamin E. Droney, St. Ann, MO (US); Ying Ma, Hoffman Estates, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 460 days.

(21) Appl. No.: 11/096,204

(22) Filed: Mar. 31, 2005

(65) Prior Publication Data

US 2006/0224621 A1    Oct. 5, 2006

(51) Int. Cl.
*G06F 7/00* (2006.01)

(52) U.S. Cl. ........................................ 707/748; 707/758

(58) Field of Classification Search ........................ None
See application file for complete search history.

(56) References Cited

U.S. PATENT DOCUMENTS

| 5,991,758 | A | * | 11/1999 | Ellard | 707/6 |
| 6,665,395 | B1 | | 12/2003 | Busey et al. | |
| 6,697,858 | B1 | | 2/2004 | Ezerzer et al. | |
| 7,124,087 | B1 | * | 10/2006 | Rodriguez et al. | 705/1 |
| 7,228,307 | B2 | * | 6/2007 | Dettinger et al. | 707/100 |
| 2002/0068558 | A1 | | 6/2002 | Janik | |
| 2005/0105712 | A1 | * | 5/2005 | Williams et al. | 704/275 |
| 2005/0204001 | A1 | * | 9/2005 | Stein et al. | 709/206 |
| 2005/0228790 | A1 | * | 10/2005 | Ronnewinkel et al. | 707/6 |

* cited by examiner

*Primary Examiner*—Tim T. Vo
*Assistant Examiner*—Jau-Shya Meng
(74) *Attorney, Agent, or Firm*—Toler Law Group

(57) ABSTRACT

A system and method for processing e-mail is provided wherein an e-mail is received from an originator or a customer, a routing destination is determined and responses to the e-mail are retrieved from a library based on the selected routing destination. Customer data is then accessed and the responses are filtered based on customer information that is extrinsic to the e-mail. An agent can select a response from the list of filtered responses and the selected response can be sent to the originator.

15 Claims, 3 Drawing Sheets

E-MAIL RESPONSE SYSTEM

FIELD OF THE DISCLOSURE

The present disclosure relates generally to an e-mail response system.

BACKGROUND

In today's environment businesses are often required to respond to a large volume of e-mails. Servicing customers who prefer text transmitted as electronic mail ("e-mail") as a method of communication has become an important part of customer service. E-mail response systems can be implemented by specialized computer systems. A goal of an e-mail response system is to determine why a customer is e-mailing a service center and to provide a satisfactory response.

Often an automated e-mail service system provides or suggests a response to a customer e-mail that is inappropriate. E-mail response systems may be required to handle a large volume of e-mails. If a small percentage of e-mails do not get an appropriate response or are inefficiently handled, a business can experience a significant increase in customer service costs. Accordingly, there is a need for an improved e-mail response system.

DETAILED DESCRIPTION OF THE DRAWINGS

A system and method for processing e-mail is provided wherein an e-mail is received from an originator or a customer, a routing destination is determined and responses to the e-mail are retrieved from a library based on the selected routing destination. Customer data may then be accessed and one or more potential responses may be filtered based on customer information that is extrinsic to the e-mail. In some embodiments, an agent can select a response from the list of filtered responses, and the selected response can be sent to the originator.

Figure 1:
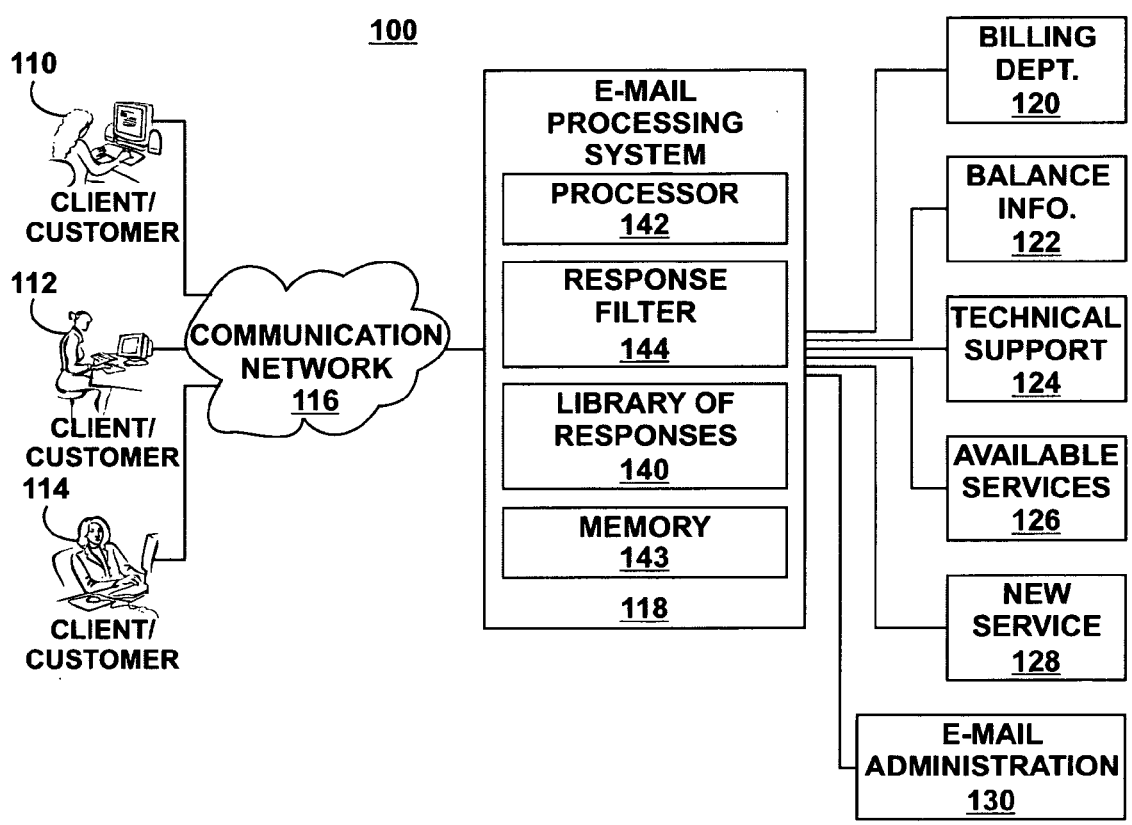
FIG. 1 illustrates a simplified configuration of an e-mail system incorporating teachings of the present disclosure.

Referring to FIG. 1, an illustrated system 100 for processing client-originated e-mail is depicted. As depicted, system 100 includes, client interfaces 110, 112 and 114, a communication network 116, an e-mail processing system 118, and a plurality of potential destinations for a given client e-mail. Illustrated destinations include a billing department 120, a balance information department 122, a technical support department 124, an available services department 126, a new service department 128, and an e-mail administrator department 130. Each department 120-130 may be capable of providing answers to client/customer-originated inquiries.

Depending upon implementation detail, one or more of departments 120-130 can be specialized such that one department may be more efficient than another in handling e-mails having specific or specialized subject matter. E-mails not intended for a specific department or having unintelligible subject matter may be routed to the e-mail administrator department 130, for example, where "manual" routing of the e-mail can be performed.

An illustrative embodiment of an e-mail processing system 118 may be a specialized e-mail server for processing and routing e-mails. The e-mail server may automatically route e-mails to an appropriate department based on recognition of subject mater of the e-mail, a type of form submitted or based on entries into a form, which may, for example, be provided by the customer, a department, a service center, and/or some other entity or device capable of populating some portion of a form.

The e-mail server may be accessible by a plurality of terminals monitored by agents, illustrated as departments 120-130. The communication network 116 may be or include portions of a plain old telephone service (POTS) system, the Internet, a wireless network, or any system that can transport, convey, or route e-mail. Additionally, while only a single e-mail administrator 130 is illustrated, it should be understood that a plurality of different administrators or types of administrators may be coupled to the e-mail processing system 118. In addition to the illustrated departments 120-130, additional departments or a variety of departments may be utilized to service incoming e-mails. Moreover, though much of the preceding and following discussion focuses on e-mail, other communication modalities may also make use of the teachings disclosed herein. For example, an Instant Message (IM) system, an IVR, and/or a VoIP offering may utilize the present teachings. In a particular embodiment, the e-mails handled by the e-mail processing system may have "attachments," embodying standardized forms or questionnaires. The e-mail may also have faxes, audio files, or voice message attached that are routed to departments 120-130.

The e-mail processing system 118 may include a processor 142, a library of responses 140, a response filter 144, and a memory 143. When a client or customer 110-114 sends an e-mail request to an e-mail service center, the e-mail processing system 118 may receive the message via communication network 116 and may classify the e-mail. Classification may involve making a determination about routing destination, such as destination 120-130 for the e-mail, and/or some other decision. In one configuration, when a destination service department is not automatically determined by the e-mail processing system, the e-mail may be sent to the administration department 130. Department 130 may review the e-mail and delegate e-mail response duties. In some embodiments, an agent at the administration department 130 may review an e-mail using a graphical user interface with selectable forwarding locations (i.e., service departments) and select a department and forward the customer request.

However when a routing destination is determined, system 118 may formulate a list of potential responses to the e-mail utilizing the library of responses 140. In some cases, the list may be limited to responses that are relevant to the department selected to handle the email. In other words, a subset of the library of responses 140 specific to the selected department can be retrieved by the processor 142. A relevance variable may also be assigned to individual responses based on recognition of the subject matter or content of the e-mail.

Depending on implementation detail, the list of responses may be arranged utilizing the relevancy percentage to form a hierarchy. A solution incorporating teachings of the present disclosure may also make use of information outside the received email and the library of responses. For example, the identity of the client (the originator of the e-mail) and the client's account information may be utilized to gather data or information about the client that is extrinsic to the subject matter or content of the e-mail. In a particular configuration, extrinsic client information may be obtained by accessing the client's account in memory 143 (or retrieving the information from external memory), and performing data analysis.

An email processing system, like system 118, may include features in addition the features described above. For example, if an e-mail processing system favors a given responses and if the given responses enjoys a high confidence level (i.e., the system is confident that it understands a customer e-mail request and that the response is proper), the e-mail processing system 118 can provide an automated response to the e-mail (a response requiring no human intervention). When a confidence level is average to low, the e-mail can be routed to an appropriate department based on the subject matter of the e-mail and a filtered list of possible responses can be provided to an agent at the receiving department.

In one example, a customer or client e-mail may request Digital Subscriber Line (DSL) services. After receipt of such a message, the request may be routed to the new services department 120 by the processor 142 operating on instruction retrieved from memory 143. The library of available responses may be initially filtered to create a list of responses specific to new services department 120 and DSL services. In addition, extrinsic customer data may be acquired and a secondary response filter may utilize the extrinsic data to filter or remove inappropriate responses. The extrinsic data may also be used to lower the relevancy of particular responses in the list. Thus, an initially filtered list—based on new service request and DSL—may include the responses below:

"We would be happy to install DSL services but we need some additional information;" and "We are sorry but DSL services are not available at this time in your area."

As indicated above this list of potential responses may be further modified using additional information, which may be extrinsic to the initial request. For example, processor 142 may retrieve additional information about a client such as the client's physical location and determine that DSL is not available at the client's location. Thus, when the response filter 144 is applied utilizing the additional information; the response, "We would be happy to install DSL services, but we need some additional information," could be deleted from the list and/or assigned a lower relevancy score.

Figure 2:
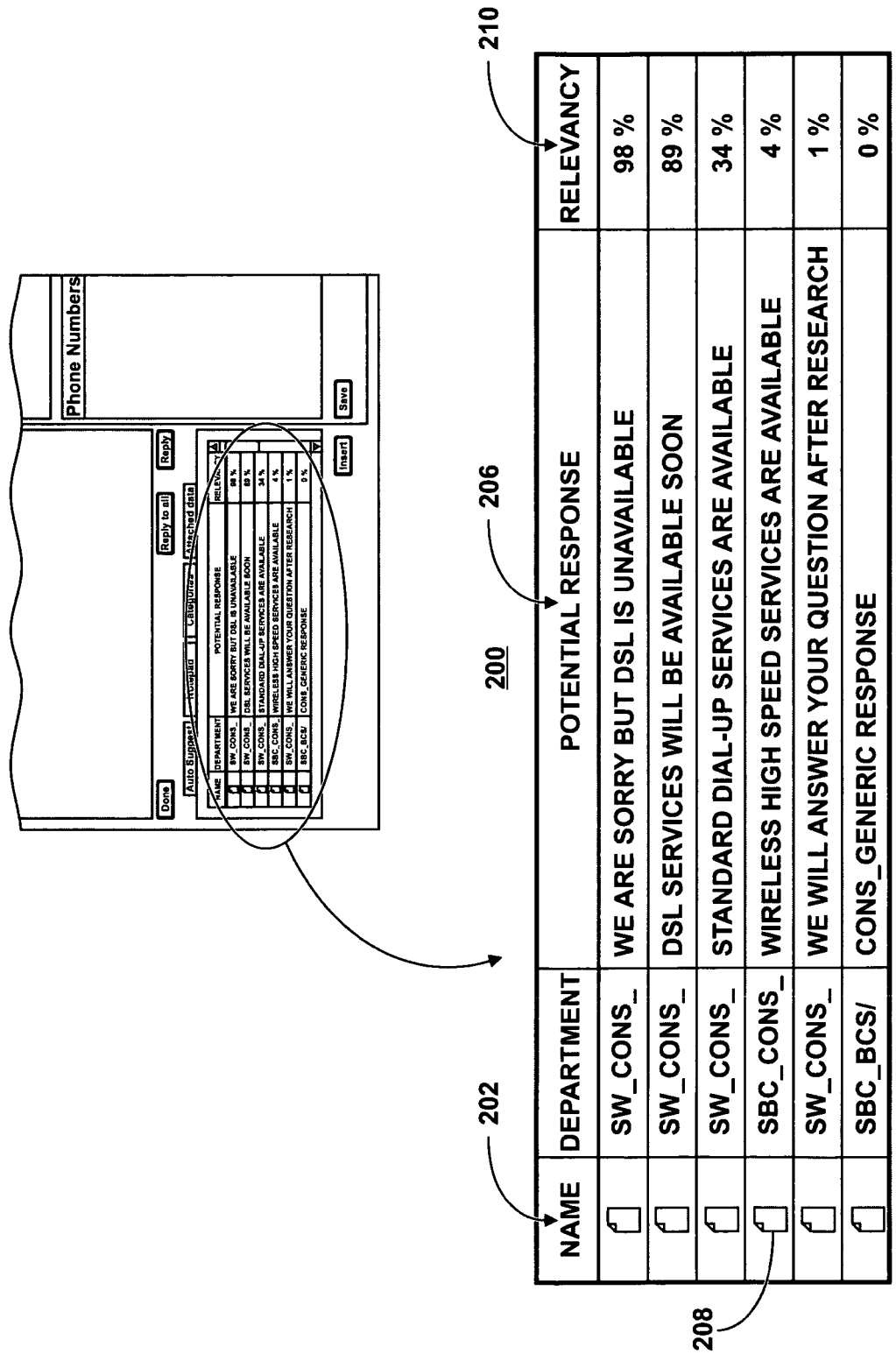
FIG. 2 depicts a graphical user interface with selectable responses.

Referring to FIG. 2, a graphical user interface 200 having selectable responses for agent review is illustrated. The heading of the graphical user interface 200 can include Name 202 (the name of the originator of the e-mail), Potential Responses 206 and a Relevancy score 210 (of the potential response). In the depicted embodiment, additional information available to the agent may be retrieved using the graphical user interface by selecting "virtual buttons" on the screen display. For example, selection of a customer file such as name 208 can display information about the customers account if an agent desires to review additional information about the customer prior to responding to the e-mail. The agent at the department may review the e-mail and "point-and-click" to select entries in the response list generated by the e-mail processing system for transmission to the originator. The relevancy percentage or confidence level generated by the e-mail processing system may also aid the agent in response selection. One example of filtering responses based on information extrinsic to the subject matter of the e-mail is provided above however; hundreds of filtering rules could be utilized to provide an efficient system.

Figure 3:
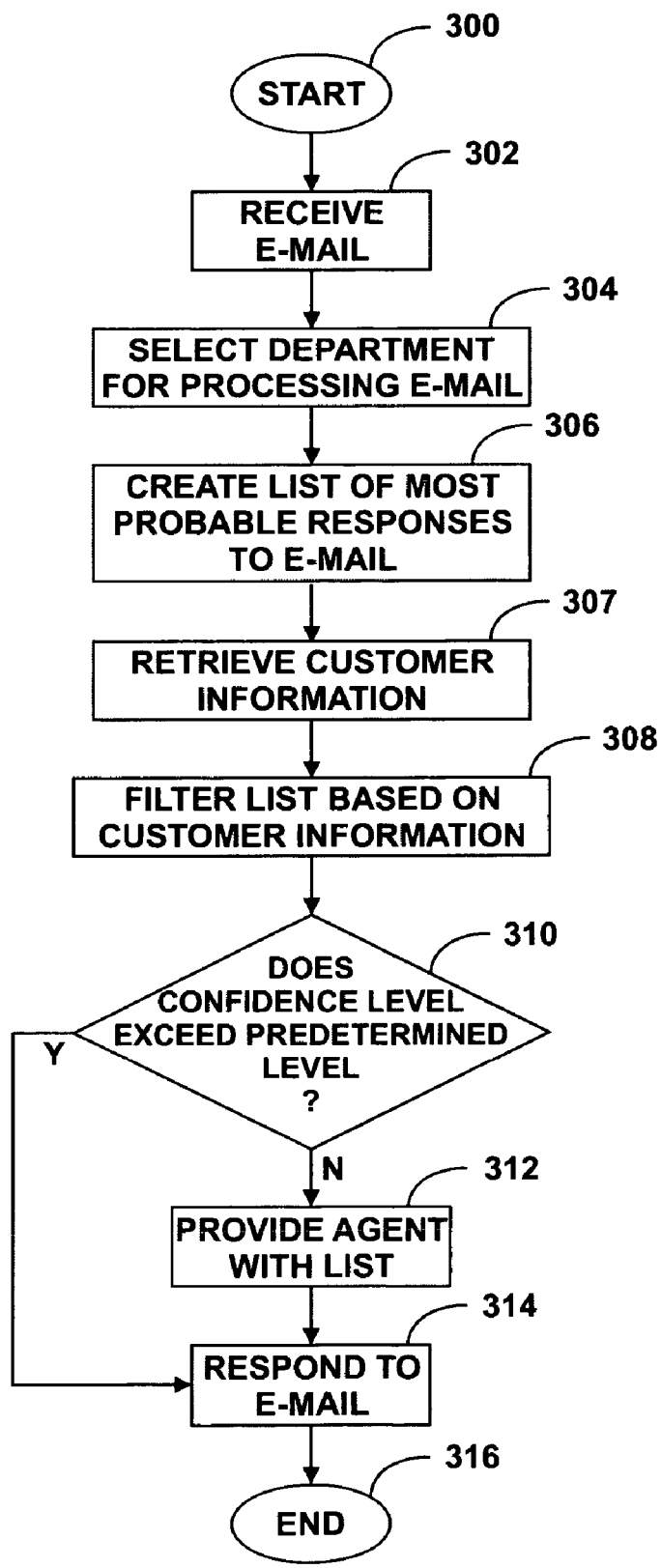
FIG. 3 is a flow diagram that illustrates a method of processing e-mails in accordance with teachings disclosed herein.

As indicated above, FIG. 3 presents a flow diagram that illustrates a method of processing e-mails in accordance with teachings disclosed herein. The method represented by FIG. 3 may be used, for example, in connection with system 100 of FIG. 1 and/or graphical user interface 200 of FIG. 2. The method starts at 300 and proceeds to step 302 where an e-mail is received from a customer. A department for processing the e-mail may be selected at step 304 based on the content and/or the subject matter of the e-mail. The e-mail may be routed to a department or an agent selected at step 304 to further analyze the message and/or to provide an acceptable response.

A list of possible responses to the received e-mail may be created at step 306 based, for example, on one or more of the selected routing option and the content of the e-mail. Information extrinsic to the e-mail such as customer information, including physical address and billing information may be retrieved at step 307, and a list of possible responses can be filtered based on the extrinsic customer information. At step 308, the filter can be employed to delete list entries or to organize the list based on the perceived relevancy of the probable responses. For example, the region where the customer lives, currently purchased services, available services, payment history, and the local services provider may be utilized to determine whether a response is likely or even appropriate.

As illustrated at decision step 310, if the relevancy of a proposed response exceeds a predetermined level, the system may automatically respond to the e-mail, as shown when the process moves to step 314. Alternately and/or in other embodiments, when the relevance does not exceed a predetermined threshold, the original e-mail and the list of probable responses may be delivered to an agent in the department selected in step 304 as is illustrated at step 312. The agent may then respond the e-mail as is illustrated by step 316. The process may end at step 316 and/or proceed through additional steps to help ensure that the customer request was properly handled. An e-mail response system incorporating the teachings disclosed herein may improve the accuracy and the speed at which an agent can answer an e-mail. Speed of response alone may increase by an appreciable amount (e.g., 20%). This increased efficiency may allow a given agent to respond to additional e-mails (as much as 18,000 or more e-mails per month) at an improved level of accuracy.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing e-mail, the method comprising:
   receiving, at an e-mail processing system including a processor and a memory, an e-mail from an originator via a communications network, wherein the e-mail includes content related to a particular service of a plurality of services;
   automatically retrieving a set of potential responses to the e-mail from the memory of the e-mail processing system, wherein the set of potential responses is determined based on the particular service;
   automatically retrieving account information related to the originator of the e-mail from the memory of the e-mail processing system;
   automatically filtering the set of potential responses at the e-mail processing system to provide a filtered and ordered set of responses, wherein the set of potential responses is filtered at least in part based on the account information related to the originator of the e-mail that is retrieved from the memory of the e-mail processing system; and automatically sending a first response from the e-mail processing system to the originator of the e-mail when the first response has a confidence level that exceeds a threshold confidence level to cause an agent not to receive the filtered and ordered set of responses, and when none of the responses has a confidence level that exceeds the threshold confidence level, assigning the e-mail and the filtered and ordered set of responses to the agent.

2. The method of claim 1, wherein the agent is determined based on the particular service.

3. The method of claim 2, wherein the particular service includes a Digital Subscriber Line (DSL) service.

4. The method of claim 1, further comprising providing a list of the filtered and ordered set of responses to the agent in order of relevancy.

5. The method of claim 4, wherein the list of the filtered and ordered set of responses is organized based on a confidence level.

6. The method of claim 1, further comprising initiating presentation of at least a portion of the filtered and ordered set of responses within a graphical user interface configured to allow the agent to select a potential response.

7. The method of claim 6, wherein the e-mail includes at least one of an attached fax, an attached audio file, and an attached voice message that is routed to the agent along with the e-mail.

8. The method of claim 1, wherein the account information related to the originator of the e-mail includes a physical address associated with the originator of the e-mail, and wherein the set of potential responses is filtered based on whether the particular service is available at the physical address.

9. The method of claim 8, wherein the particular service includes a Digital Subscriber Line (DSL) service.

10. The method of claim 1, wherein the account information related to the originator of the e-mail includes one or more purchased services of the plurality of services, and wherein the set of potential responses is filtered based on whether the particular service is one of the one or more purchased services.

11. The method of claim 1, wherein the account information related to the originator of the e-mail includes payment history information, and wherein the set of potential responses is filtered at least in part based on the payment history information.

12. The method of claim 1, further comprising initiating presentation of at least a portion of the filtered and ordered set of responses within a graphical user interface that is configured to allow the agent to review the e-mail and to forward the e-mail to another agent.

13. The method of claim 1, wherein the e-mail includes an attached form, and wherein the e-mail processing system automatically determines that the e-mail includes content related to the particular service based on an entry in the attached form.

14. A method of responding to an e-mail, the method comprising:

receiving, at an e-mail processing system including a processor and a memory, an e-mail from a user via a communications network, wherein the e-mail includes content related to a particular service of a plurality of services;

automatically determining a routing destination for the e-mail based on the particular service included in the content of the e-mail;

automatically retrieving possible responses to the e-mail based on the routing destination;

automatically retrieving account information related to the originator of the e-mail from the memory of the e-mail processing system;

automatically determining whether the originator of the e-mail subscribes to the particular service based on the account information;

automatically filtering the possible responses at the e-mail processing system to produce a filtered list of responses, wherein the possible responses are filtered at least in part based on whether the originator of the e-mail subscribes to the particular service;

assigning a relevancy score to each possible response of the filtered list of responses;

automatically sending a response from the filtered list of responses from the e-mail processing system to the originator of the e-mail when the relevancy score associated with the response exceeds a threshold relevancy level; and when none of the responses of the filtered list of responses exceeds the threshold relevancy level, sorting the filtered list of responses based on the assigned relevancy scores to produce a relevancy ordered list of responses and initiating display of the relevancy ordered list of responses at an agent terminal.

15. The method of claim 14, wherein the particular service includes a Digital Subscriber Line (DSL) service.

* * * * *